United States Patent [19]

Ziolkowski et al.

[11] Patent Number: 4,500,978

[45] Date of Patent: Feb. 19, 1985

[54] SEISMOGRAPHIC METHOD AND APPARATUS USING SCALED SOUND SOURCES

[75] Inventors: Antoni M. Ziolkowski, Twickenham; William E. Lerwill, Keston, both of England

[73] Assignee: Seismograph Service Corporation, Tulsa, Okla.

[21] Appl. No.: 399,119

[22] Filed: Jul. 16, 1982

Related U.S. Application Data

[63] Continuation of Ser. No. 142,924, Apr. 23, 1980, abandoned.

[51] Int. Cl.³ .................. G01V 1/13; G01V 1/40
[52] U.S. Cl. ........................ 367/142; 367/15; 367/23; 367/144; 181/118; 181/120
[58] Field of Search ............ 367/21, 23, 43, 46, 367/56, 59, 48, 49, 27, 144; 181/110, 111, 118, 120

[56] References Cited

U.S. PATENT DOCUMENTS

| | | | |
|---|---|---|---|
| 3,076,177 | 1/1963 | Lawrence et al. | 367/48 |
| 3,274,542 | 9/1966 | Ruehle | 367/46 |
| 3,351,899 | 11/1967 | Luehrman et al. | 181/118 |
| 3,744,021 | 7/1973 | Todd | 367/23 |
| 3,893,559 | 7/1975 | Mott-Smith | 367/144 |
| 4,038,630 | 7/1977 | Chelminski | 367/21 |
| 4,170,002 | 10/1979 | Strange | 367/23 |
| 4,326,271 | 4/1982 | Ziolkowski | 181/111 |

OTHER PUBLICATIONS

Safar, "An Efficient Method of Operating the Air Gun", 2/80, pp. 85–94, Geophy. Prosp., vol. 28, 1.
Ziolkowski, "A Method of Calculating . . . Air Gun", 1970, pp. 137–161, Geophys. J. R. Astr. Soc., vol. 21.
Ziolkowski, "Design of a Marine . . . Sound Source", 1971, pp. 499–530, Geophys. J. R. Astr. Soc., vol. 23.
Newman et al. "Theory . . . Marine Seismic Exploration", 9/77, pp. 47th Anniv. Mtg. of Exp. Geoph.

*Primary Examiner*—Nelson Moskowitz
*Attorney, Agent, or Firm*—Mason, Kolehmainen, Rathburn & Wyss

[57] ABSTRACT

A seismic method and apparatus utilizes two point sound sources located at the same location on the earth to produce sound waves at different amplitudes and times. The reflections of the sound waves are analyzed to determine the acoustic properties and rock boundaries within the earth.

17 Claims, 5 Drawing Figures

SOURCE SCALING: EFFECT ON FAR FIELD WAVELET

SYNTHETIC AIR GUN WAVEFORMS. TOP: 10 CU.IN.; BOTTOM: 80 CU.IN. NOTE THAT MAXIMUM AMPLITUDE OF BOTTOM TRACE IS TWICE THAT OF TOP

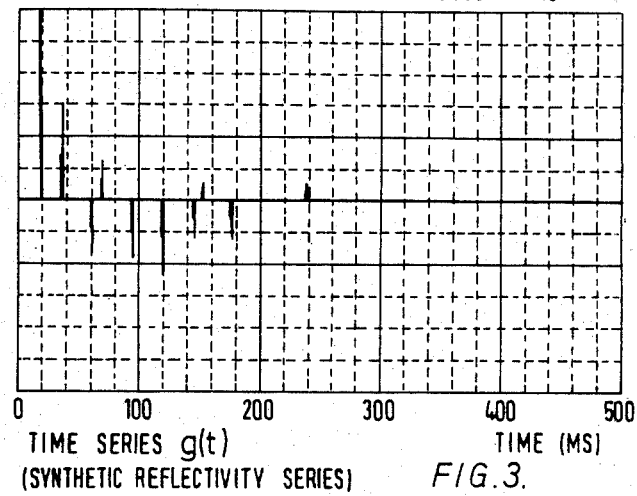
TIME SERIES g(t)
(SYNTHETIC REFLECTIVITY SERIES) FIG.3.
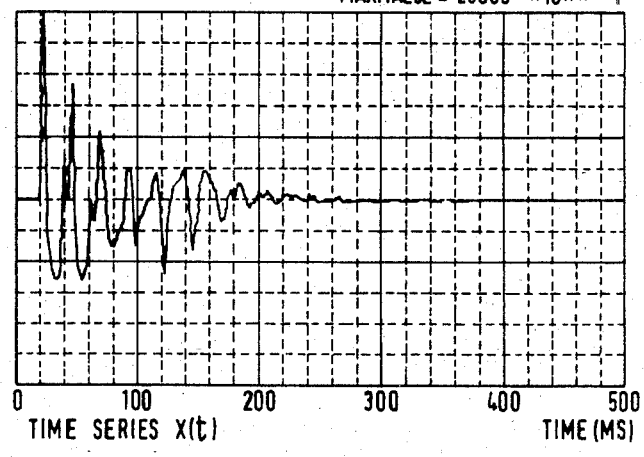
TIME SERIES X(t)
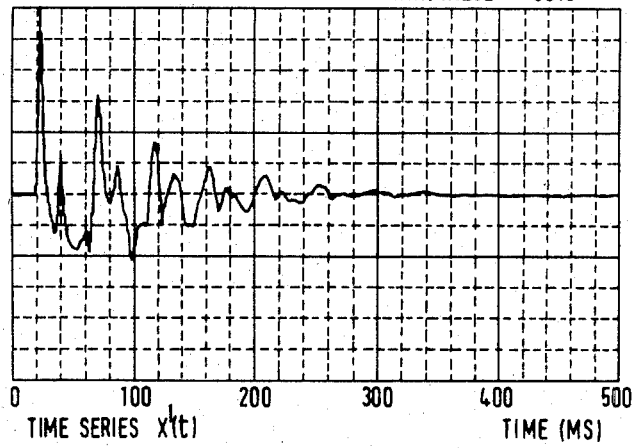
TIME SERIES X'(t)
HORIZONTAL SCALES ARE THE SAME;
VERTICAL SCALES ARE DIFFERENT FIG.4.

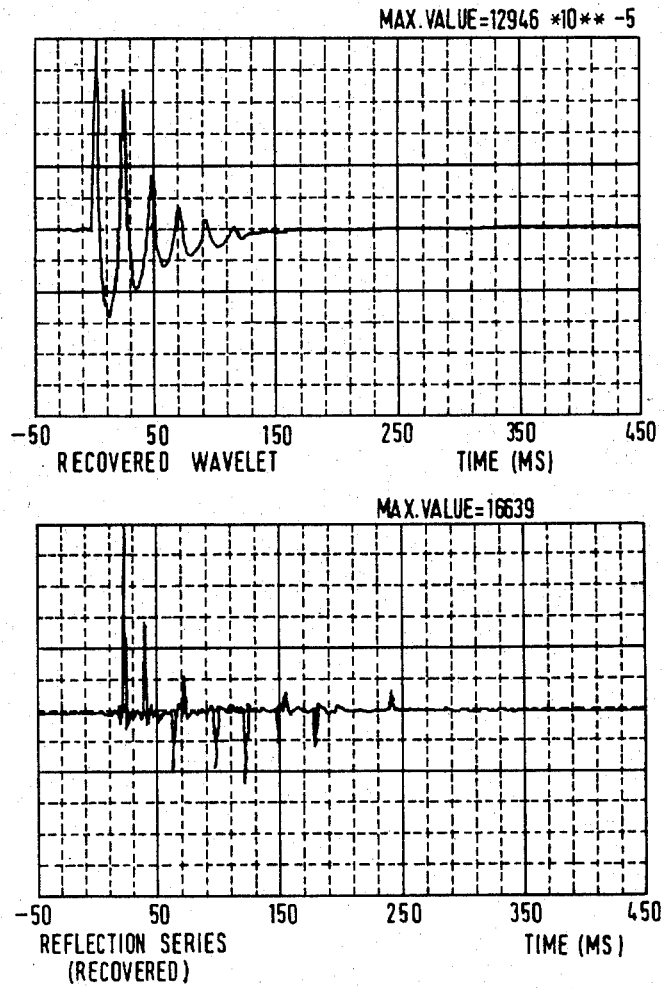

SEISMOGRAPHIC METHOD AND APPARATUS USING SCALED SOUND SOURCES

This is a continuation of application Ser. No. 142,924, filed Apr. 23, 1980, now abandoned.

DESCRIPTION

This invention relates to a method of determining the location in the earth of sub-surface boundaries and, or the acoustic properties of sub-surface layers in the earth and to apparatus for this purpose.

There is well-known a seismic reflection technique which employs a sound source at or near the earth's surface to emit an impulsive sound wave at a known time. As this sound wave passes through the earth it encounters boundaries between the different sub-surface layers. At each boundary some of the sound is transmitted and some is reflected. A receiver at or near the surface close to the source detects the reflected waves which arrive at later and later times.

A record (or seismogram) made of the receiver response is then processed to determine the amplitudes and arrival times of the individual reflections. These may then be used to determine the locations of the rock boundaries within the earth and/or the acoustic properties of the rock either side of each boundary.

The accuracy of such analysis depends on the ability of the processing technique to separate the individual reflections from one another. One of the reasons that this is a non-trivial task is that it is extremely difficult to generate a purely impulsive sound wave. The sound wave generated by most seismic sound sources has a duration which is longer than the smallest separation time interval of which the recording system is capable of measuring. In other words, the series of reflections which arrives at the receiver is not the series of impulses one desires (the reflectivity series); it is a series of overlapping wavelets. The processing step which is used to remove the effect of the source from the recorded signal in an attempt to recover the reflectivity series is usually known as deconvolution.

The conventional description of a seismic signal regards the propagation of seismic waves as a linear elastic process in which the signal $x_1(t)$ is obtained as the convolution of the impulse response of the earth $g(t)$ with a far field source wavelet $s(t)$. Usually some additive noise is also present so that $$x_1(t) = s(t) \cdot g(t) + n_1(t) \quad (1)$$

where the asterisk * denotes convolution. One wishes to extract $g(t)$ uncontaminated by either $s(t)$ or $n_1(t)$. However, $n_1(t)$ is not normally known, and often $s(t)$ cannot be measured or predicted and must also be regarded as unknown.

Since $s(t)$, $g(t)$ and $n_1(t)$ are all unknowns, the problem of finding $g(t)$ from the measurable quantity $x_1(t)$ is basically that of solving one equation containing three unknowns. It cannot be done, of course. Even when the noise can be ignored the essential difficulty remains; that of deconvolving $s(t)$ and $g(t)$. Unless $s(t)$ is known $g(t)$ cannot be found without a lot of assumptions.

The noise term $n_1(t)$ will be small compared with the signal term $s(t)*g(t)$ provided there is enough signal energy. In order to achieve an adequate signal-to-noise ratio it is sometimes necessary to repeat the experiment a number of times in the same place, up to a total of, say, p times, using the same sound source, or identical sound sources. The series of received seismic signals $x_1(t)$, $x_2(t), \ldots x_p(t)$ is summed to form a composite signal $x(t)$, where $$x(t) = \sum_{i=1}^{p} x_i(t)$$

Equation (1) then becomes $$x(t) = p \cdot s(t) \cdot g(t) + n(t), \quad (1a)$$

where n(t) is a composite noise signal, given by $$n(t) = \sum_{i=1}^{p} n_i(t).$$

This summation is known as a "vertical stack" and p is the "fold of stack" and is an integer greater than or equal to 1. The same, or similar, result may sometimes be obtained by generating p identical impulsive sound waves simultaneously. If the sources do not interact, each one will generate an identical far field wavelet $s(t)$, and the received signal $x(t)$ will be described by equation (1a).

For more than twenty years much ingenuity has been devoted to devising methods for solving equation (1) or (1a) using assumptions which are as realistic as possible. But the fact remains that these assumptions are made purely for mathematical convenience. They are not substitutes for hard information.

The best known example of such a method is the least-squares time-domain inverse filtering method used throughout the industry. For this method to be valid it is required that:

(1) $g(t)$ be a stationary, white, random sequence of impulses;
(2) $s(t)$ be minimum-phase and have the same shape throughout the seismigram;
(3) there be no absorption.

All these assumptions are very strong, and they must all be correct simultaneously if the method is to work. This condition is very difficult to satisfy, especially since the assumptions are not mutually reinforcing. For example in attempting to satisfy the stationarity assumption, some sort of spherical divergence correction must first be applied. This has the effect of distorting $s(t)$ unevenly down the seismogram which immediately invalidates the assumption that the shape of $s(t)$ remains constant; it also introduces a tendency for $s(t)$ to be non-minimum-phase in the early part of the seismogram.

BRIEF DESCRIPTION OF DRAWINGS

FIG. 3 depicts the wavelet convolved with a synthetic reflectivity series.

FIG. 4 depicts the results of providing the convolution of FIG. 3.

Figure 1:
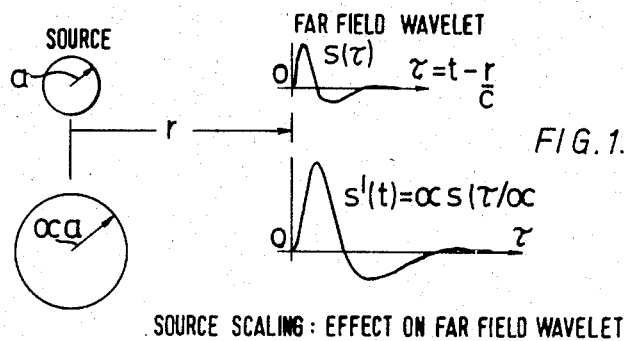
FIG. 1 illustrates source scaling and its effect on the far field wavelet.

The recovered wavelet and reflectivity series are show in FIG. 5.

According to a first aspect of the present invention there is provided a method of determining the location in the earth of sub-surface boundaries and/or the acoustic properties of sub-surface features in the earth which method comprises employing one or more first and one or more second point sound sources to produce respectively first and second sound waves, the energy of the elastic radiation of the or each first source differing by a known factor from the energy of the elastic radiation of the or each second source, detecting reflections of said first and second sound waves from within the earth and generating therefrom respective first and second seismic signals and subjecting these two seismic signals to analysis and comparison.

According to a second aspect of the present invention there is provided apparatus for determining the location in the earth of sub-surface boundaries and/or the acoustic properties of sub-surface features in the earth which apparatus comprises one or more first point sound sources and one or more second point sound sources adapted respectively to produce first and second sound waves in the earth, the energy of the elastic radiation of the or each first source differing by a known factor from the energy of the elastic radiation of the or each second source, receiver means for detecting reflections of said first and second sound waves from within the earth and generating therefrom respective first and second seismic signals, and means for analysing and comparing said first and second seismic signals.

In the present invention the first and second sound sources may be individual point sound sources or there may be employed a plurality of identical non-interacting point sound sources which will produce a seismic signal having a greater signal-to-noise ratio.

Alternatively the receiver means may be adapted to sum a series of identical seismic signals obtained by repeated production of identical sound waves by one or more identical sound sources.

The term "point source" is employed throughout the specification to denote a source whose maximum dimension is small compared with the shortest wavelength of the useful radiation it generates. If this source is buried in an homogenous isotropic elastic medium it will generate spherically symmetric radiation at distances greater than about a wavelength. This is the far-field region in which any aspherical distortions of the wavefield from this point source will occur only at high frequencies outside the useful bandwidth.

The method of the present invention is suitable for buried point sources, on land and at sea. It requires none of the assumptions demanded by known methods. In particular, nothing is assumed about differences in the amplitude or phase spectra of s(t) and g(t). The present invention is based upon the fact that the wavelet obeys a scaling low of the type:

$$s^1(\tau_2) = \alpha s(\tau_1/\alpha) \quad (2)$$

In this equation, $\tau_1$ and $\tau_2$ are both very nearly equal to $\tau = t - r/c$ where t is time measured from the shot instant, r is the distance from the sound source to a point in the far field, and c is the speed of sound in the medium; $s^1(\tau_2)$ is the far field wavelet of a source similar to that which generates $s(\tau_1)$, but which contains $\alpha^3$ times as much energy. FIG. 1 shows diagrammatically how this source scaling law affects the far field wavelet.

There is excellent experimental evidence for the existence of such a scaling law for a variety of point sources and this law can readily be derived for explosives, for example, if the following assumptions are made:
 i. that the elastic radiation from the source possesses spherical symmetry; thus it will be applicable to most marine sources such as a single air gun, a single water gun, a marine explosive such as that available under the Trade Mark "Maxipulse", a marine source employing high pressure steam to cause an implosion such as that available under the Trade Mark "Vaporchoc," or a sparker and to explosives buried on land but probably not to surface sources because their radiation is not spherically symmetric;
 ii. that the fraction of the total available energy stored in the explosive which is converted into elastic radiation is a constant for a given type of explosive and a given medium;
 iii. that the volume of the explosive may be neglected relative to the volume of the sphere of anelastic deformation produced by the explosion;
 iv. that the elastic radiation produced by the explosion could be obtained by replacing the sphere of anelastic deformation by a cavity at the interior of which there is applied a time-dependent pressure function P(t) and that P(t) is independent of the mass of the explosive and is constant for explosives of the same chemical composition in the same medium; and
 v. that $\tau_1$, for an explosion of a first mass and $\tau_2$ for an explosion of a second mass can be taken to be approximately equal and equal to $\tau$. This is sufficiently accurate if the time interval $\Delta\tau$ between $\tau_1$ and $\tau_2$ is unobservable within the frequency band of interest, i.e. $\Delta\tau$ should be less than about one sample interval. This approximation will suffice for values of $\alpha$ up to about 5 or so.

To exploit the scaling law a seismic signal x(t) as described by equation (1a) is generated. The experiment is then repeated in the same place using a source of the same type but containing $\alpha^3$ times as much energy. This will generate a seismogram:

$$x^1(t) = qs^1(t) \cdot g(t) + n^1(t) \quad (3)$$

where $s^1(t)$ is the far field wavelet of the source and is defined in equation (2); g(t) is the same as in equation (1) because it is the response of the earth to an impulse in the same place; the noise $n^1(t)$ may be different from n(t) in equation (1a); q is a known integer greater than or equal to 1 and which may be different from p in the equation (1a).

Let us consider these equations together for the case where the noise is negligibly small:

$$x(t) = ps(t) \cdot g(t) \quad (4)$$

$$x^1(t) = qs(t) \cdot g(t) \quad (5)$$

$$s^1(t) = as(t/\alpha) \quad (2)$$

In these three independent equations there are three unknowns: s(t), $s^1(t)$ and g(t). Therefore, in principle when the noise is negligibly small, we can solve for all three exactly without making further assumptions.

By taking Fourier transforms and by manipulation we obtain the equation $$qS(\alpha f) = \frac{p}{\alpha^2} S(f) \cdot R(f) \quad (6)$$

where R(f) is defined as for equation 13 hereinafter.

Equation (6) suggests a recursive algorithm of the form:

$$qS(\alpha^n f_o) = \frac{p}{\alpha^2} S(\alpha^{n-1} f_o) R(\alpha^{n-1} f_o) \quad (7)$$

$$n = 1, 2, \ldots, N$$

where N is dicated by the highest frequency of interest and the process must be initiated with a guess at $f_o$. If $\alpha > 1$ equation (7) enables us to work up the spectrum calculating values at $\alpha f_o$, $\alpha^2 f_o$, ... $\alpha^N f_o$ starting with a guess at $f_o$.

To compute values at frequencies less than $f_o$, equation (6) can be rearranged:

$$pS(f) = q\alpha^2 S(\alpha f)/R(f)$$

such that we obtain the recursion:

$$pS(f_o/\alpha^n) = q\alpha^2 S(f_o/\alpha^{n-1})/R(f_o/\alpha^n) \quad (8)$$

$$n = 1, 2, \ldots, M$$

where M is dictated by the lowest frequency of interest. This now enables the values at frequencies $f_o/\alpha$, $f_o/\alpha^2$, ..., $f_o/\alpha^M$ to be computed.

Thus from the recursion scheme of equations (7) and (8) we can obtain values at frequencies $f_o/\alpha^M$, $f_o/\alpha^{M-1}$, ..., $f_o/\alpha$, $f_o$, $\alpha f_o$, ..., $\alpha^N f_o$. We can now use an interpolation routine to find a value at another specified frequency, say $f_1$, and use the recursion to calculate values at $\alpha f_1$, $\alpha^2 f_1$ etc. This procedure is repeated until sufficient values have been computed. Once S(f) has been calculated, s(t) is obtained by taking the inverse Fourier transform.

It should be noted that the quantities involved in the algorithm are complex. One can operate either with the modulus (amplitude) and argument (phase), or with the real and imaginary parts. The real and imaginary parts have been used in the example as these are considered to be the most 'basic' components of the complex numbers in a computer, whereas amplitude and phase are admixtures of these quantities,

The Initial Guess

The algorithm is initiated with a guess. If this guess is wrong, the final result will be wrong. The guess at $f_o$ is a complex number which, in all probability, will not be the true value at $f_o$. In fact, the guess $S_G(f_o)$ is related to the true value $S(f_o)$ in the following way:

$$S_q(f_o) = re^{i\theta} S(f_o) \quad (9)$$

where $re^{i\theta}$ is the unknown complex error factor. If this error is not taken into account there will be generated the values:

$$qS_G(\alpha^n f_o) = \frac{p}{\alpha^2} S_G(\alpha^{n-1} f_o) R(\alpha^{n-1} f_o) \quad (10)$$

$$n = 1, 2, \ldots, N$$

which, with sufficient interpolation yield the function $S_G(f_o)$ for $^N f_o/\alpha^M \leq f \leq f_o$. The range can be extended to the origin by defining $S_q(O) = 0$ which is compatible with a time series $S_G(t)$ with zero mean.

The effect of the initial error can be seen by substituting equation 9 into equation 10; thus:

$$qS_G(\alpha^n f_o) = qre^{i\theta} S(\alpha^n f_o) \quad (11)$$

$$= \frac{p}{\alpha^2} re^{i\theta} S(\alpha^{n-1} f_o) R(\alpha^{n-1} f_o)$$

It is evident that the error factor is constant for all the values deduced from the algorithm. Thus far the algorithm has allowed computation of the function:

$$S_q(f) = re^{i\theta} S(f), (O \leq f \leq \alpha^N f_o) \quad (12)$$

where $f_o$ has been assumed to be positive.

Two problems now exist. First the transform must be completed by generating values of $S_G(f)$ at negative frequencies.

Secondly the error factor must be found to obtain S(f) from equation (12). Both these problems can be solved by consideration of the physical properties of s(t), which impose constraints on the properties of S(f).

It is known that s(t) is real, and therefore the estimated wavelet should be real. This constraint imposes Hermitian symmetry on S(f). That is, the real and imaginary parts of S(f) must be even and odd functions, respectively. Thus if S(f) is known for positive frequencies, S(f) can easily be computed for negative frequencies using this condition.

However, only $S_G(f)$ is known, which is in error by a phase shift $\theta$ and a scale factor r. The scale factor is unimportant because it has no effect on the shape of s(t), and consequently cannot affect our estimate of the shape of g(t). It can therefore be ignored.

However, the phase error $\theta$ cannot be ignored, because this will make $S_G(t)$ non-causal, and it is known that s(t) is causal. That is, s(t) is zero for times t less than zero. In the frequency domain causality imposes the condition that the odd and even parts of the Fourier transform are a Hilbert transform pair. It can be shown that this causal relationship is destroyed unless the phase error $\theta$ is zero.

This consideration suggests a trial-and-error procedure for improving the estimate of s(t). This is as follows:

1. Compute $S_G(f)$ from an initial guess as $f_o$ as described above, noting that $S_G(f)$ and S(f) are related as in (12).
2. Multiply $S_G(f)$ by a correction factor $e^{-i\theta_G}$ where $\theta_G$ is a guess.
3. Impose Hermitian symmetry.
4. Check for causality. If the recovered wavelet is non-causal, return to step 2 and repeat, using a different $\theta_G$. This procedure is repeated until the causality condition is met.

Thus the equations may be solved in the frequency domain using the algorithm described above and applying the constraints which follow from two physical properties of s(t): it is real and causal. The final estimate of s(t) will be in error only by a scaling factor r, which is trivial. Having obtained a satisfactory estimate of s(t), g(t) can be obtained using equation (1), by standard methods.

The algorithm described depends on a complex division in the frequency domain. There are two problems associated with this. First, the ratio will become unstable at any frequency at which the amplitude of the denominator is too small. Secondly, if the denominator contains non-minimum-phase components which are not contained in the numerator then the quotient becomes unstable in the sense that it is non-realisable.

To solve the first problem it is usual to add a small threshold of white noise to the denominator to negate the possibility of zero or near zero division. An alternative but more time-consuming method is to search for low values in the denominator and to replace them with small positive values.

Finding the inverse of non-minimum phase wavelets is a well-known problem. However, the problem can be avoided simply by applying an exponential taper of the form $e^{-\gamma t}$ to both $x(t)$ and $x^1(t)$. By choosing $\gamma$ large enough the quotient $R(f)$ can be forced to be stable, but then the estimates of $s(t)$, $s^1(t)$ and $g(t)$ will be distorted. In practice the distoration may be removed simply by applying the inverse taper $e^{\gamma t}$ to these functions.

In the presence of noise the problem is to obtain a reliable estimate of the ratio spectrum $R(f)$, for then the scaling law and recursive algorithm can be used to find $S(f)$ as described above.

From equation (6) we define $R(f)$ in the absence of noise as:

$$R(f) = \frac{X^1(f)}{X(f)} = \frac{qS^1(f)}{pS(f)} \quad (13)$$

It follows that $$s^1(t) = r(t) \cdot s(t) \quad (14)$$

where $r(t)$ is the inverse Fourier transform of $R(f)$ and, since $s(t)$ and $s^1(t)$ are both real and causal, $r(t)$ most also be real. However, $r(t)$ will not be causal unless $s(t)$ is minimum-phase. Both $s(t)$ and $s^1(t)$ must be forced to be minimum-phase by applying the exponential taper to $x(t)$ and $x^1(t)$ as described above. Under these conditions $r(t)$ will be real and causal.

In the noise-free case it is also true that $$x^1(t) = r(t) \cdot x(t) \quad (15)$$

and it will be seen that $r(t)$ is simply a one-sided filter which shapes $x(t)$ into $x^1(t)$, provided the correct exponential taper has been applied. When noise is present the estimate of $r(t)$ must be stabilized and this can easily be done using a least-squares approach (N. Levinson, in N. Wiener, 1947; Extrapolation, Interpolation and smoothing of Stationary Time Series, Wiley, N.Y.). That is, a filter $r^1(t)$ is found which, for an input $x(t)$ will give an input which is the best fit in a least-squares sense to $x^1(t)$. This filter $r^1(t)$ will be the best estimate of $r(t)$.

In other words, in the presence of noise $r(t)$ can be calculated in the time domain using standard programs, and then its Fourier transform taken, whence $s(t)$ etc, can be found as described above.

It will be understood that although the problem has been discussed in terms of the scaled energies of the elastic radiation of the sources, normally the particle velocities or the sound pressures generated by the source may be detected and recorded using respectively a geophone or a hydrophone as conventionally employed.

It will further be understood that the individual elements of the apparatus of this invention may be chosen at will to be suitable for the particular purpose for which they are required, thus air guns, water guns, "Maxipulse," "Vaporchoc," sparkers etc. may be employed as the sources. Similarly any suitable analysers, receivers etc may be employed as necessary.

It is believed that $\alpha$ may have a value of from 1.1 to 3, more preferably from 1.5 to 3.

EXAMPLE

Applying the above wavelet deconvolution scheme to a synthetic example.

Figure 2:
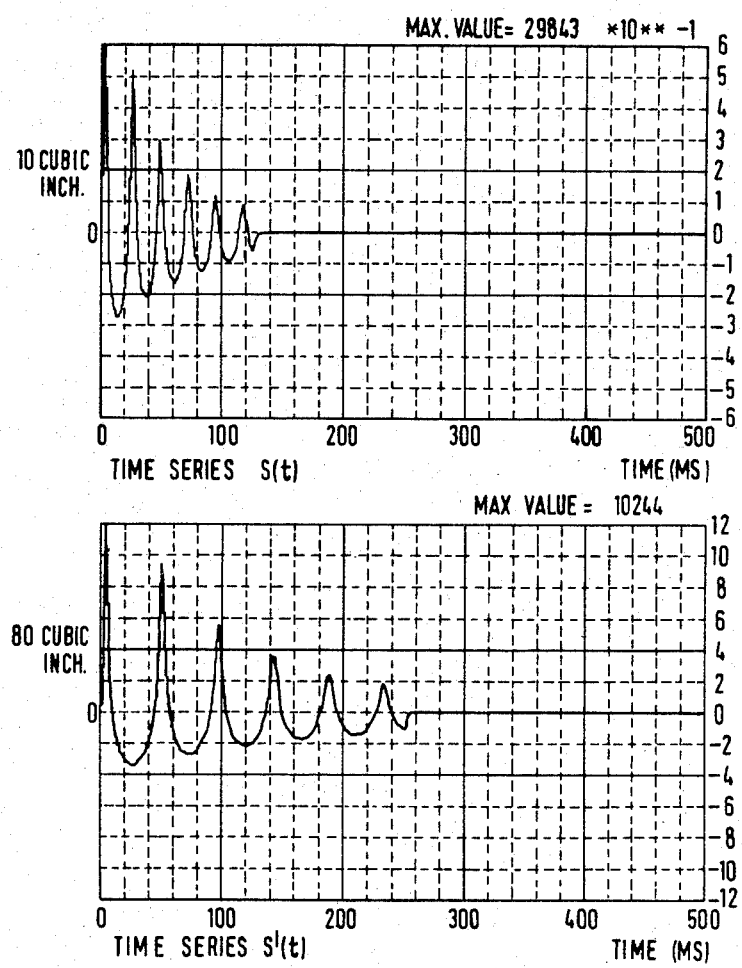
FIG. 2 depicts two independent synthetic far field source wavelets.

Two independent synthetic far field source wavelets as shown in FIG. 2 were generated. Each wavelet was calculated using a model as described in the Geophysical Journal of the Royal Astronomical Society 21, 137–161, for the signal generated by an air gun in water. The model is based on the nonlinear oscillations of a spherical bubble in water and takes into account nonlinear elastic effects close to the bubble. The model predicts waveforms which very closely match measurements.

The top wavelet $s(t)$ of FIG. 2 was computed for a 10 cubic inch gun at a depth of 30 feet, a firing pressure of 2000 p.s.i. and a range of 500 feet from the gun. No sea surface reflection has been included. The bottom wavelet $s^1(t)$ was computed using the same computer program for a 80 cubic inch gun, at the same depth, firing pressure, and range. In other words, only the volume was changed.

Secondly each of these wavelets was convolved with the synthetic reflectivity series $g(t)$ shown in FIG. 3. The result of performing these convolutions is shown in FIG. 4. The top trace $x(t)$ represents the convolution of $g(t)$ with the upper wavelet $s(t)$ of FIG. 1; the bottom trace $x^1(t)$ represents the convolution of $g(t)$ with the lower wavelet $s^1(t)$ of FIG. 1. Thus these two traces, $x(t)$ and $x^1(t)$, were constructed entirely independently without any use of the scaling law.

It was then assumed that these two traces had been obtained knowing only that they were from the same place and that the top one was made using a 10 cubic inch gun, while the bottom was made using an 80 cubic inch gun at the same depth and pressure.

Since only the gun volume was changed, the scaling law can be invoked. In this case $\alpha^3 = 8$; therefore $\alpha = 2$.

Solving for $s(t)$ and $g(t)$ as described above using the set of simultaneous equations (4), (5) and (2) with $p = q = 1$, substituting $\alpha = 2$, the recovered wavelet and reflectivity series are shown in FIG. 5; they compare very well with the top wavelet of FIG. 2 and the original reflectivity series of FIG. 3. The small difference between the recovered series and the original are attributed primarily to computer round-off error.

This example shows that the method is valid in principle.

Thus by means of the present invention in the absence of noise the impulse response of the earth can be obtained exactly. In the presence of noise a stable approximation to this impulse response can be obtained, the accuracy of which approximation is dependent on the noise level present.

We claim:

1. A method of determining the location of sub-surface boundaries and/or the acoustic properties of sub-surface features in the earth, which method comprises employing a first point sound source and subsequently but at the same location as that of said first point sound source a second point sound source of the same type as the first point sound source to produce first and second mutually non-interfering sound waves of the same shape but at a different amplitude and time scale, the energy of the elastic radiation of the first source differing by a known factor from the energy of the elastic radiation of the second source and being such that the frequency spectra of the respective sound waves overlap, detecting reflections of said first and second sound waves from within the earth and generating therefrom respective first and second seismic signals and subjecting these two seismic signals to analysis and comparison to define the impulse response of the earth substantially in the absence of the far field source wavelet and noise.

2. A method according to claim 1, wherein a plurality of identical signals is summed to generate said first seismic signal.

3. A method according to claim 2, wherein said plurality of identical seismic signals is obtained by producing a series of identical sound waves by the use of one or more identical sound sources.

4. A method according to claim 1, 2 or 3, wherein a plurality of identical seismic signals is summed to generate said second seismic signal.

5. A method according to claim 4, wherein said plurality of identical seismic signals is obtained by producing a series of identical sound waves by the use of one or more identical sound sources.

6. A method according to claim 1, wherein a plurality of identical non-interacting sound sources is employed simultaneously to produce said first sound wave.

7. A method according to claim 1 or 6, wherein a plurality of identical non-interacting sound sources is employed simultaneously, to produce said second sound wave.

8. Apparatus for determining the location in the earth of sub-surface boundaries and/or the acoustic properties of sub-surface features in the earth, which apparatus comprises a first point sound source and a second point sound source of the same type as the first point sound source adapted respectively to produce first and second mutually non-interfering sound waves in the earth with said second point sound source being employed subsequently to said first point sound source but at the same location as said first point sound source, said first and second mutually non-interfering sound waves being of the same shape and having different respective amplitudes and time scales, the energy of the elastic radiation emitted by the first source differing by a known factor from the energy of the elastic radiation emitted by the second source and being such that the frequency spectra of the respective sound waves overlap, receiver means for detecting reflections of said first and second sound waves from within the earth and generating therefrom respective first and second seismic signals, and means for analysing and comparing said first and second seismic signals to derive the impulse response of the earth substantially in the absence of the far field source wavelet and of noise.

9. Apparatus to claim 8, wherein said first sound source comprises one or more identical sound sources arranged to produce a series of identical sound waves and the receiver includes means for summing said series of identical sound waves to produce said first seismic signal.

10. Apparatus according to claim 8 or 8, wherein said second sound source comprises one or more identical sound sources arranged to produce a series of identical sound waves and the receiver includes means for summing said series of identical sound waves to produce second seismic signal.

11. Apparatus according in claim 8, wherein said first sound source comprises a plurality of identical non-interacting point sound sources arranged to produce simultaneously said first sound wave.

12. Apparatus according to claim 8 or 11, wherein said second sound source comprises a plurality of identical non-interacting point sound sources arranged to produce simultaneously said second sound wave.

13. A method according to claim 1, wherein each sound source comprises an air gun, a water gun, a marine or a sub-surface land explosion generator, an implosive marine source or a sparker.

14. A method according to claim 1, wherein said known factor is from 1.1 to 27.

15. A method according to claim 1, wherein said known factor is from 3.375 to 27.

16. Apparatus according to claim 12, wherein said known factor is arranged to be from 1.1 to 27.

17. Apparatus according to claim 8, wherein said known factor is arranged to be from 3.375 to 27.

* * * * *